(12) United States Patent
Jenkins et al.

(10) Patent No.: US 8,454,069 B2
(45) Date of Patent: Jun. 4, 2013

(54) GRIPPER WITH ADJUSTABLE BUMPER STOPS

(75) Inventors: Anthony Jenkins, Clawson, MI (US); Michael A. Filipiak, Ann Arbor, MI (US); Conrad Earl Waldorf, Pinckney, MI (US)

(73) Assignee: Norgren Automation Solutions, LLC, Saline, MI (US)

( * ) Notice: Subject to any disclaimer, the term of this patent is extended or adjusted under 35 U.S.C. 154(b) by 248 days.

(21) Appl. No.: 12/953,073

(22) Filed: Nov. 23, 2010

(65) Prior Publication Data

US 2011/0062734 A1 Mar. 17, 2011

Related U.S. Application Data

(63) Continuation of application No. 11/786,892, filed on Apr. 13, 2007, now Pat. No. 7,845,698.

(60) Provisional application No. 60/904,978, filed on Mar. 5, 2007.

(51) Int. Cl.
*B25J 15/04* (2006.01)

(52) U.S. Cl.
USPC ............ 294/202; 294/203; 294/115; 294/116

(58) Field of Classification Search
USPC ............ 294/198, 202, 203, 115, 116; 269/32, 269/34
See application file for complete search history.

(56) References Cited

U.S. PATENT DOCUMENTS

| | | | | | |
|---|---|---|---|---|---|
| 2,850,926 | A | * | 9/1958 | Jobe | 269/234 |
| 3,599,957 | A | * | 8/1971 | Blatt | 269/32 |
| 4,234,223 | A | * | 11/1980 | O'Neil | 294/203 |
| 4,252,361 | A | * | 2/1981 | Descoteaux et al. | 294/205 |
| 4,537,389 | A | * | 8/1985 | Kancnik et al. | 269/34 |
| 4,950,011 | A | * | 8/1990 | Borcea et al. | 294/2 |
| 5,277,689 | A | * | 1/1994 | Ruetschle et al. | 483/36 |
| 5,938,259 | A | * | 8/1999 | Sawdon et al. | 294/116 |
| 5,941,513 | A | * | 8/1999 | Moilanen et al. | 269/32 |
| 6,056,281 | A | * | 5/2000 | Moilanen et al. | 269/32 |
| 6,079,896 | A | * | 6/2000 | Dellach | 403/322.3 |
| 6,565,074 | B1 | * | 5/2003 | Wheeler | 269/32 |
| 7,021,687 | B2 | * | 4/2006 | Moilanen et al. | 294/116 |
| 7,845,698 | B2 | * | 12/2010 | Jenkins et al. | 294/202 |

FOREIGN PATENT DOCUMENTS

| | | | |
|---|---|---|---|
| EP | 0857547 | * | 8/1998 |
| EP | 1004410 | * | 5/2000 |
| EP | 1649968 | * | 4/2006 |
| JP | 11051116 | * | 2/1999 |

* cited by examiner

*Primary Examiner* — Dean Kramer
(74) *Attorney, Agent, or Firm* — Young, Basile, Hanlon & MacFarlane P.C.

(57) ABSTRACT

A gripper assembly including at least one gripper jaw and an actuator operative for moving the at least one gripper jaw. A support is fixed relative to the actuator for supporting the at least one gripper jaw, wherein the support has at least one mount location formed in the support. A stop member is removably affixable to the support at the at least one mount location for limiting movement of the at least one gripper jaw wherein the size of the stop member corresponds to a discrete maximum degree of opening of the at least one gripper jaw.

17 Claims, 3 Drawing Sheets

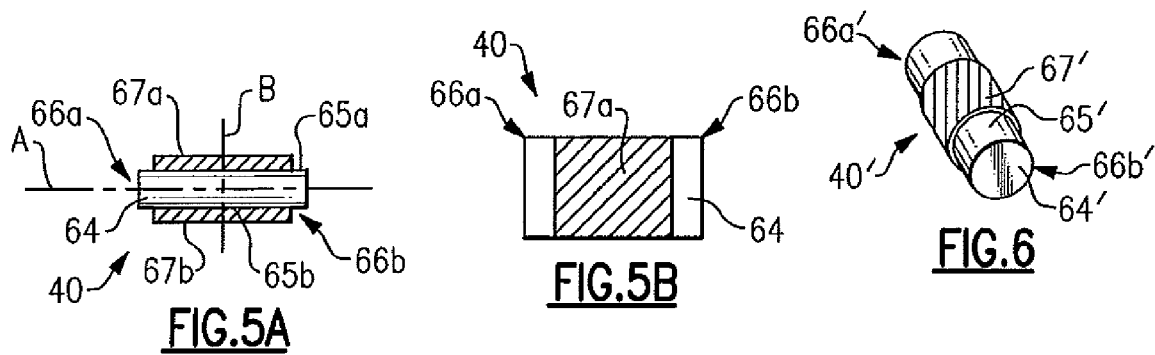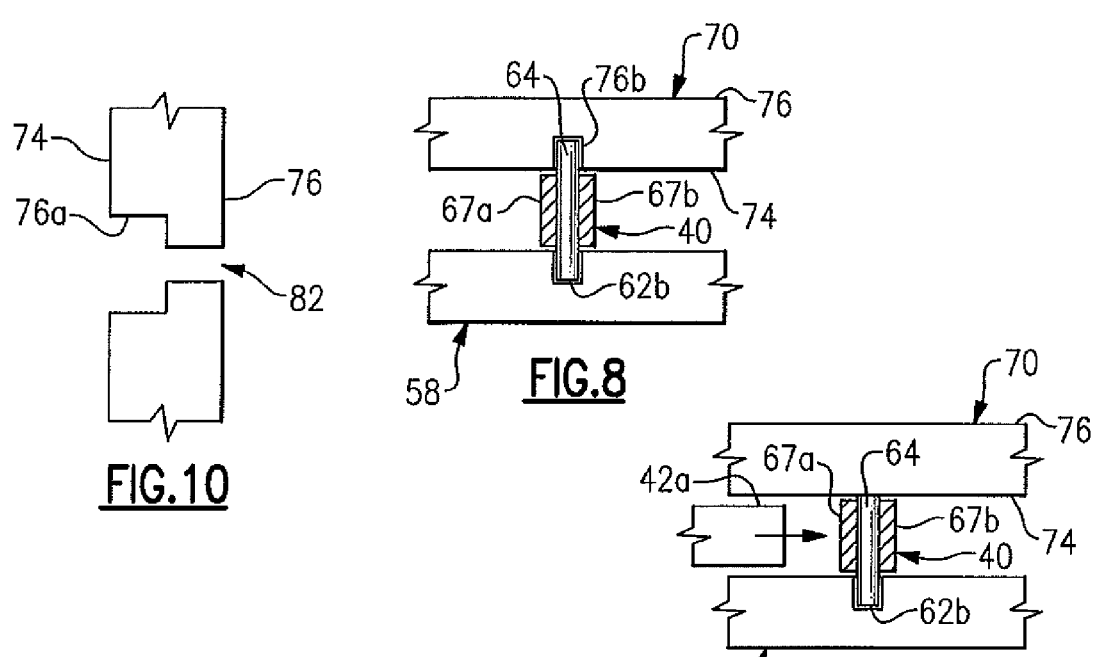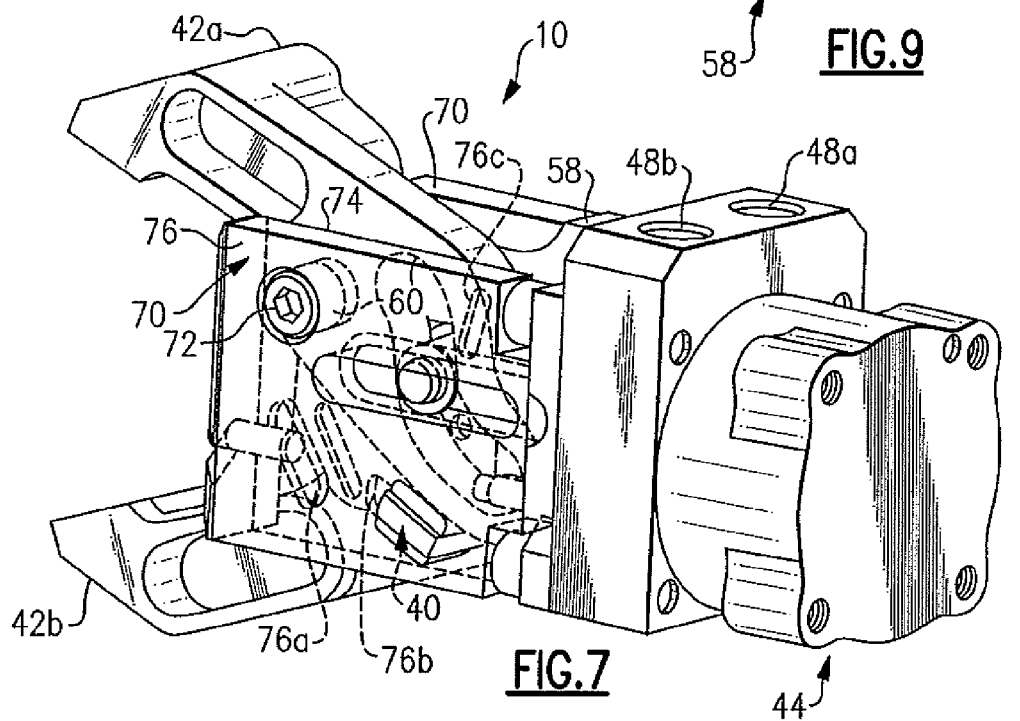

GRIPPER WITH ADJUSTABLE BUMPER STOPS

REFERENCE TO RELATED APPLICATIONS

The application is a continuation application of U.S. patent application Ser. No. 11/786,892, filed on Apr. 13, 2007, now U.S. Pat. No. 7,845,698, issued on Dec. 7, 2010, which claims priority to U.S. Provisional Application No. 60/904,978 which was filed on Mar. 5, 2007.

BACKGROUND OF THE INVENTION

This invention generally relates to automated handling equipment. More particularly, this invention relates to an actuated gripper device having adjustable bumper stops for limiting the degree to which gripper jaws open.

Automated handling equipment is typically employed in industrial settings for transferring work pieces between work stations. Typically, the equipment includes a gripper that clamps the work pieces while moving them between the stations. Conventional grippers include an actuator that moves one or more gripper jaws between open and closed jaw positions. In some examples, the grippers move within tight spaces in the work stations. In this respect, the degree to which the gripper jaws open must be controlled in order to avoid contact with the surrounding work stations.

Typically, the automated handling equipment is adapted for a particular work station. When a different product is produced at the work station, or when the automated handling equipment is used for a different work station, it may be desirable to change the degree to which the jaws open to suit the particular work station or to suit a particular work piece size. In this regard, the grippers must be adjustable. Accordingly, there is a need for a gripper having an adjustable bumper stop for varying a degree to which a gripper jaw opens that can be easily adjusted without having to significantly disassemble the gripper. This invention addresses this need and provides enhanced capabilities while avoiding the shortcomings and drawbacks of the prior art.

SUMMARY OF THE INVENTION

A gripper assembly includes at least one gripper jaw and an actuator that is operative for moving the at least one gripper jaw. A support is fixed relative to the actuator for supporting the at least one gripper jaw and has at least one mount location formed on the support. A stop member is removably affixable to the support at the at least one mount location for limiting movement of the at least one gripper jaw wherein the size of the stop member corresponds to a discrete maximum degree of opening of the at least one gripper jaw.

The stop member may include a body having side surfaces wherein the side surfaces have different and discrete thicknesses that correspond to different maximum degrees of opening of the at least one gripper jaw. At least one pad may be used to partially cover the side surfaces of the body such that the thickness of the at least one pad corresponds to a discrete maximum degree of opening of said at least one gripper jaw. The at least one pad may be fabricated from a polymeric material.

The mount location may include an opening formed in the support for receiving the stop member. The support may also include at least one cover wherein the at least one cover may include an opening for receiving the stop member.

BRIEF DESCRIPTION OF THE DRAWINGS

FIG. 5A illustrates an example rectangular bumper stop.

FIG. 5B illustrates a top view of the example rectangular bumper stop.

FIG. 6 illustrates an example cylindrical bumper stop.

FIG. 7 illustrates an example gripper assembly having a cover that supports a bumper stop.

FIG. 8 illustrates an example of the bumper stop supported between the cover and the support.

FIG. 9 illustrates an example of the bumper stop cantilevered from the support.

FIG. 10 illustrates a selected portion of the cover shown in FIG. 7 having an opening therethrough for identifying a location of the bumper stop.

DETAILED DESCRIPTION OF THE PREFERRED EMBODIMENT

Figure 1:
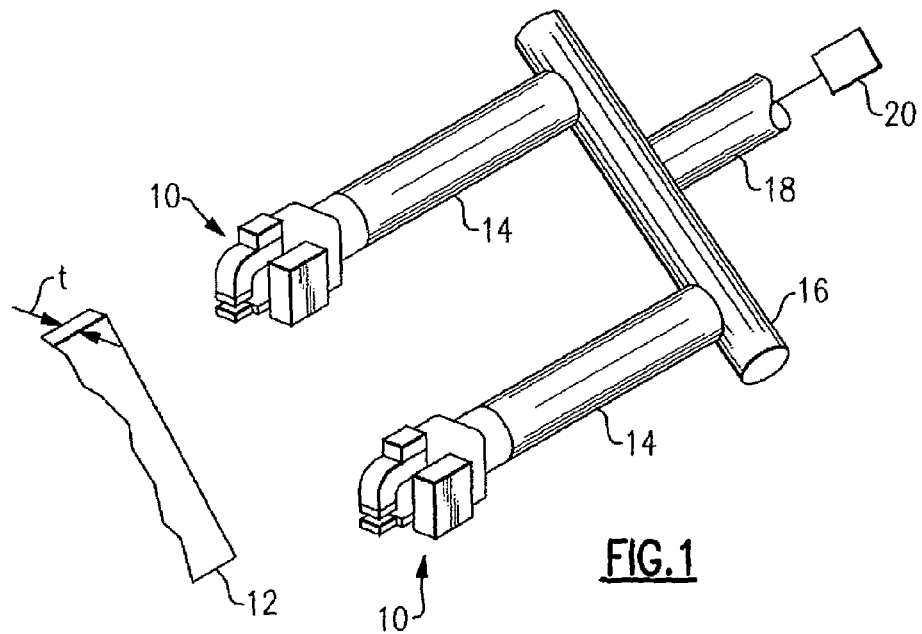
FIG. 1 illustrates example gripper assemblies in an example industrial setting.

FIG. 1 schematically illustrates selected portions of several gripper assemblies 10 used in an example industrial setting to grip and move work pieces 12 (shown schematically). The gripper assemblies 10 may be used in a variety of different configurations than that shown. As an example, the gripper assemblies 10 are coupled to extended arms 14, which are secured to a rail 16. An adapter arm 18 is secured to the rail 16. An automated machine 20, such as a robot, moves the adapter arm 18, the extended arms 14, and the gripper assemblies 10 to desired positions to retrieve and deposit the work pieces 12, such as between work stations.

Figure 2:
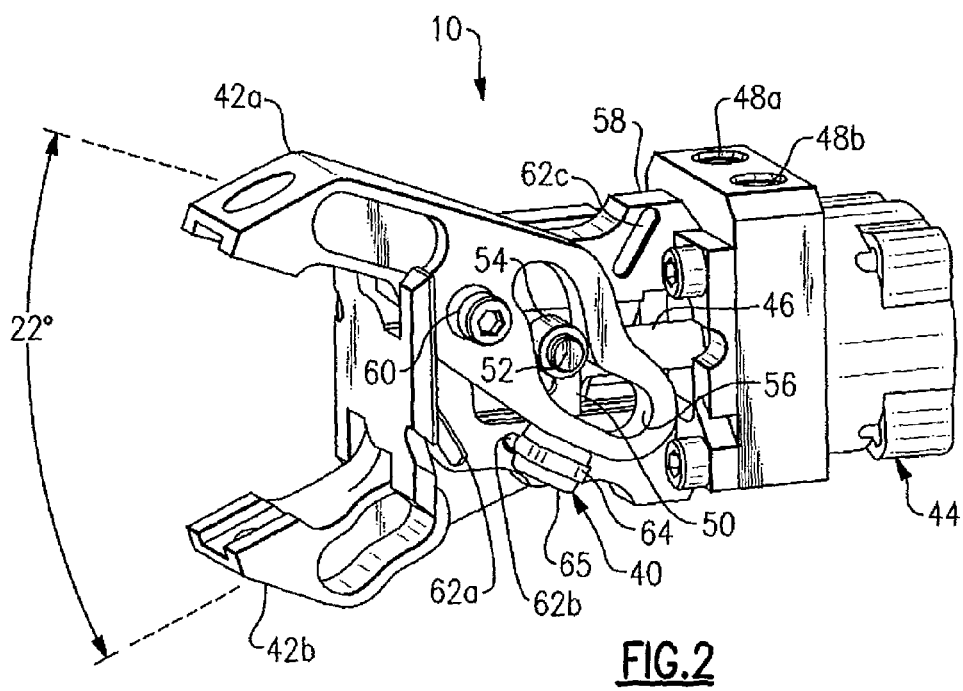
FIG. 2 illustrates an example gripper assembly having a bumper stop in one possible location.
Figure 3:
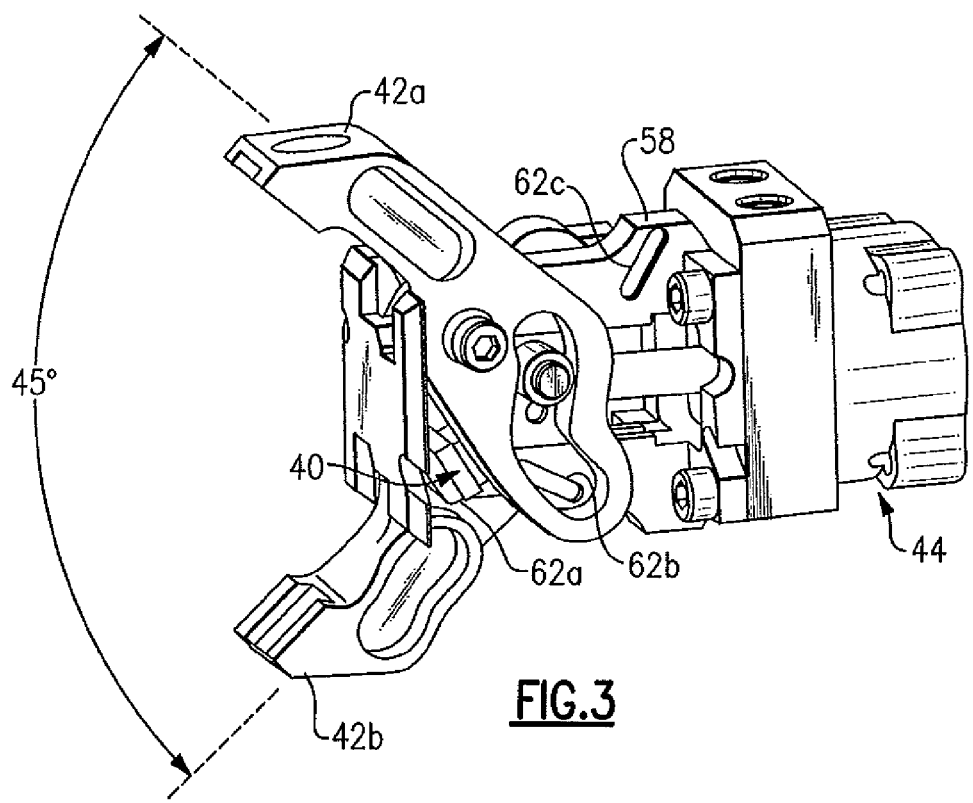
FIG. 3 illustrates the example bumper stop in another possible location.
Figure 4:
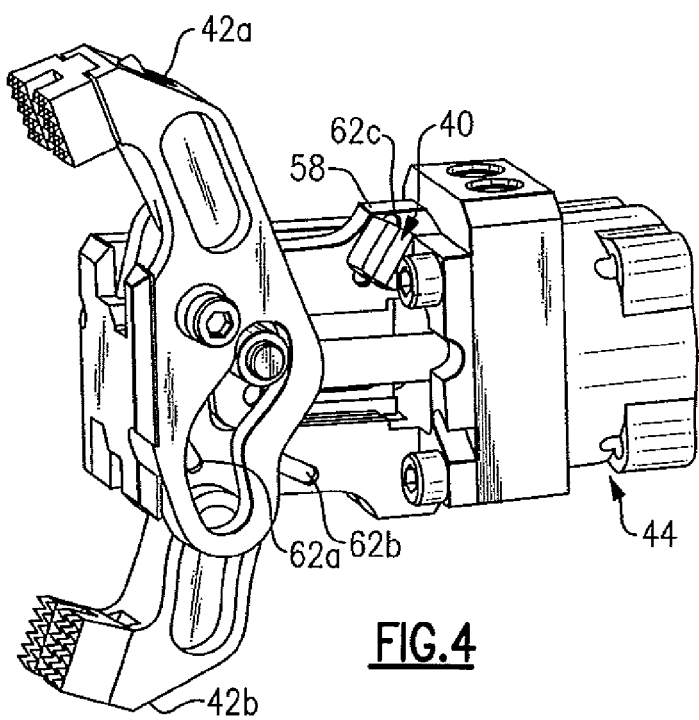
FIG. 4 illustrates the example bumper stop in a stored location.

FIGS. 2-4 illustrate an example gripper assembly 10 having an adjustable bumper stop 40 for limiting opening of the gripper jaws 42a and 42b. In this example, the gripper assembly 10 includes an actuator 44, such as a pneumatic or hydraulic fluid-driven actuator, having a reciprocating piston (not shown) therein that linearly moves a piston rod 46. The actuator 44 includes ports 48a and 48b for receiving fluid from a fluid source to actuate the actuator 44. It is to be understood that other types of actuators may alternatively be used.

A distal end (relative to the actuator 44) of the piston rod 46 includes a cam head 50 having cam pins 52 (one shown) extending laterally therefrom relative to the direction of movement of the piston rod 46. In this example, each of the cam pins 52 includes a roller 54 that is received within a cam slot 56 of a respective gripper jaw 42a or 42b.

The cam head 50 moves linearly within a support 58 attached to the actuator 44. In this example, the support 58 includes pivot bosses 60 (one shown) extending laterally therefrom for pivotally supporting the respective gripper jaws 42a and 42b. The support 58 includes a plurality of mount locations 62a, 62b, and 62c, such as recessed slots in the illustrated example, for securing the bumper stop 40. Although three mount locations 62a, 62b, and 62c are shown, it is to be understood that more or less than three may also be used. Given this description, one of ordinary skill in the art will recognize alternative gripper assembly configurations that will benefit from the examples disclosed herein.

The mount locations 62a, 62b, and 62c provide a variety of different possible locations for attaching the bumper stop 40 to the support 58. In the disclosed example, the location 62a corresponds to a 45° open position of the gripper jaws 42a and 42b (FIG. 3). The location 62b corresponds to a 22° open position of the gripper jaws 42a and 42b (FIG. 2). The location 62e corresponds to a storage position for the bumper stop 40 where the bumper stop 40 does not interact with the jaws 42a and 42b to limit opening (FIG. 4). Given this description, one of ordinary skill in the art will recognize that different mount locations than shown may be selected during a design stage to obtain different degrees of opening, for example. The opening of the jaws 42a and 42b can also be changed by using jaws having different shaped cam slots.

In operation, the actuator 44 moves the piston rod 46 forward in the illustrated figures to open the gripper jaws 42a and 42b. As the gripper jaws 42a and 42b open, at least one of the jaws 42a and 42b encounters the bumper stop 40, which limits further rotation of the gripper jaws 42a and 42b about their respective pivot bosses 60. By adjusting the location of the bumper stop 40 between the various mount locations 62a, 62b, or 62c, one can provide a desired degree of jaw opening. It is to be understood that a bumper stop 40 can be used for each respective jaw 42 and 42b or to stop only one of the jaws 42a or 42b since stopping one jaw would stop both in the example gripper configuration.

Referring to FIGS. 5A and 5B, the bumper stop 40 includes a body 64 having side surfaces 65a and 65b that extend between ends 66a and 66b. In this example, the bumper stop 40 includes pads 67a and 67b that partially cover the respective side surfaces 65a and 65b. The pads 67a and 67b are made of a resilient material, such as a polymer. In one example, the polymer is an elastomer that cushions impact of the jaws 42a and 42b.

The pads 67a and 67b in the disclosed example have nominally equivalent thicknesses. However, in other examples, different thicknesses may be used to provide different degrees of jaw opening depending on the orientation of the bumper stop 40. That is, orienting the bumper stop 40 such that a relatively thicker one of the pads 67a or 67b impacts the jaws 42a or 42b to provide a smaller degree of jaw opening, while orienting a relatively thinner one of the pads 67a or 67b to impact the jaws 42a or 42b would provide a larger degree of jaw opening.

The pads 67a and 67b leave portions of the side surfaces 65a and 65b exposed at end 66a, end 66b, or both. The unexposed portion or portions of the ends 66a and 66b function as mounting sections (e.g., tabs) that are receivable into the recessed slots of the mount locations 62a, 62b, or 62c. In other words, although the figures show both ends 66a and 66b exposed to function as mounting sections, alternatively only one of the ends 66a or 66b may be exposed such that the bumper stop 40 includes only one mounting section. The mounting section or sections and the recessed slots provide a tight fit that securely attaches the bumper stop 40 to the support 58. The size of the exposed portions may vary, depending on the needs of a particular gripper assembly.

In the illustrated example, the bumper stop 40 is symmetrical relative to central orthogonal axes A and B such that the bumper stop 40 functions identically whether end 66a or end 66b is received into the recessed slots of the mount locations 62a, 62b, or 62e (for equivalent pad 67a and 67b thicknesses).

As can be appreciated, the body 64 in the illustrated example is rectangular, which provides the benefit of relatively planar faces for bonding or otherwise securing the pads 67a and 67b to the side surfaces 65a and 65b. Alternatively, the shape may be different. For example, FIG. 6 illustrates a bumper stop 40' that is similar to the bumper stop 40 but includes a body 64' that is cylindrical. In this example, a surface 65' extends between ends 66a' and 66b', and a pad 67' partially covers the surface 65'. As can be appreciated, circular openings would be used rather than recessed slots at the mount locations 62a, 62b, and 62c to mount the bumper stop 40'. Given this description, one of ordinary skill in the art will recognize alternative body shapes to meet their particular needs.

Optionally, as illustrated in FIG. 7, covers 70 are secured on each lateral side of the gripper assembly 10 using corresponding fasteners 72 (one shown) attached to the respective pivot bosses 60 (one shown). Alternatively, the covers 70 may be attached to the actuator 44. Each of the covers 70 includes an inside surface 74 and an outside surface 76 relative to the support 58.

Referring also to FIG. 8, the inside surface 74 of the cover 70 includes cover mount locations 76a, 76b, and 76c that correspond to the mount locations 62a, 62b, and 62c of the support 58. Thus, when one end of the bumper stop 40, 40' is received into one of the mount locations 62a, 62b, or 62c, and the cover 70 is subsequently attached onto the gripper assembly 10, the other end of the bumper stop 40, 40' is received into a corresponding cover mount location 76a, 76b, or 76c of the cover 70. The bumper stop 40, 40' is thereby supported on each end.

Alternatively, as shown in FIG. 9, the cover 70 may not include the mount locations 76a, 76b, and 76c. That is, the bumper stop 40, 40' may be cantilevered from the mount locations 62a, 62b, 62c of the support 58 without being supported by the cover 70. Although the bumper stop 40, 40' may fit tightly into the corresponding mount locations 62a, 62b, and 62c, the cover 70 prevents the bumper stop 40, 40' from dislodging from the mount locations 62a, 62b, and 62c due to impact from the jaw 42, for example. The cover 70 may abut the bumper stop 40, 40' to limit movement of the bumper stop 40, 40' outwards from the mount locations 62a, 62b, and 62c to thereby prevent dislodging.

The bumper stop 40, 40' provides the benefit of being able to easily and conveniently change the degree to which the gripper jaws 42a and 42b are able to open without having to disassemble a large number of components of the gripper assembly 10. For example, to move the bumper stop 40, 40' from the mount location 62a to the mount location 62b, one of the fasteners 72 is removed to enable removal of the cover 70. The bumper stop 40, 40' is then manually removed from the mount location 62a and placed within the mount location 62b before replacing the cover 70 and tightening the fastener 72. In examples where the gripper assembly 10 does not include covers 70, the bumper stop 40, 40' can be removed from any of the mount locations 62a, 62b, or 62c and placed within another of the mount locations 62, 62b, or 62c without having to disassemble any components of the gripper assembly. Furthermore, since the bumper stops 40, 40' may be attached to the support 58 without using fasteners, the bumper stops 40, 40' can be quickly and easily adjusted.

Referring to FIG. 10, the cover 70 originally includes one or more openings 82 that extend through the outer surface 76. In this example, the opening 82 corresponds to the cover mount location 76a. The opening 82 allows an operator to visually determine whether the bumper stop 40, 40' is located at the mount location 62a by looking through the opening 82. Alternatively, the bumper stop 40, 40' extends through the opening 82 to allow visual determination. Likewise, the cover 70 may include similar openings corresponding to the cover mount location 76b and 76c.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A gripper assembly, comprising:
   at least one gripper jaw;
   a support for supporting said at least one gripper jaw, wherein said support has at least one mount location formed therein; and
   a stop member removably affixable to said support at said at least one mount location for limiting movement of said at least one gripper jaw by engagement of said stop member with said at least one gripper jaw, wherein the size of said stop member corresponds to a discrete maximum degree of opening of said at least one gripper jaw, said stop member having a body with a first side surface and a second side surface formed thereon, wherein at least one pad partially covers the first side surface and the second side surface and at least part of the first side surface and the second side surface are not covered by the at least one pad to define a mounting section that is receivable within a recess of said at least one mount location of said support.

2. The gripper assembly stated in claim 1, further comprising:
   an actuator connected to said support and operative for moving said at least one gripper jaw, wherein said actuator is fixed relative to said support.

3. The gripper assembly stated in claim 1, further comprising:
   said stop member having a body with side surfaces formed thereon, wherein at least one pad partially covers said side surfaces such that the thickness of said at least one pad corresponds to a discrete maximum degree of opening of said at least one gripper jaw.

4. The gripper assembly stated in claim 3, further comprising:
   said at least one pad fabricated from a polymer.

5. The gripper assembly stated in claim 1, further comprising:
   said mount location having an opening formed in said support for receiving said stop member.

6. The gripper assembly stated in claim 1, further comprising:
   said support including at least one cover, wherein said at least one cover provides an opening for receiving said stop member.

7. A gripper assembly, comprising:
   at least one gripper jaw;
   an actuator operative for moving said at least one gripper jaw;
   a support fixed to said actuator for supporting said at least one gripper jaw;
   at least one mount location having a recess formed in said support; and
   a stop member removably affixable to said support by being received in said recess of said at least one mount location for limiting movement of said at least one gripper jaw by engagement of said stop member with said at least one gripper jaw, wherein the size of said stop member corresponds to a discrete maximum degree of opening of said at least one gripper jaw, said stop member having a body with a first side surface and a second side surface, wherein at least one pad partially covers the first side surface and the second side surface and at least part of the first side surface and the second side surface are not covered by the at least one pad to define a mounting section that is receivable within a recess of said at least one mount location of said support.

8. The gripper assembly stated in claim 7, further comprising:
   said side surfaces having pads that partially cover said side surfaces such that the thickness of said pads correspond to a discrete maximum degree of opening of said at least one gripper jaw.

9. The gripper assembly stated in claim 8, further comprising:
   said at least one pad fabricated from an elastomeric material.

10. The gripper assembly stated in claim 7, further comprising:
    said stop member having a substantially rectangular body; and
    said recess of said mount location being substantially rectangular for receiving said substantially rectangular body of said stop member.

11. The gripper assembly stated in claim 7, further comprising:
    said stop member having a substantially cylindrical body; and
    said recess of said mount location being substantially cylindrical for receiving said substantially cylindrical body of said stop member.

12. The gripper assembly stated in claim 7, further comprising:
    said support including at least one cover wherein said recess of said mount location is formed in said at least one cover.

13. The gripper assembly stated in claim 12, further comprising:
    said stop member having a substantially rectangular body; and
    said recess of said mount location being substantially rectangular for receiving said substantially rectangular body of said stop member.

14. The gripper assembly stated in claim 12, further comprising:
    said stop member having a substantially cylindrical body; and
    said recess of said mount location being substantially cylindrical for receiving said substantially cylindrical body of said stop member.

15. The gripper assembly stated in claim 7, further comprising:
    said at least one gripper jaw movable between a closed position and an open position, wherein said at least one gripper jaw abuts said stop member in said open position and is spaced from said stop member in said closed position.

16. A gripper assembly, comprising:
    a first gripper jaw having a cam slot;
    a second gripper jaw having a cam slot;
    an actuator operative for moving the first gripper jaw and the second gripper jaw;
    a support that is fixed relative to the actuator, pivotally supports the first gripper jaw and the second gripper jaw, and is positioned between the first gripper jaw and the second gripper jaw, the support having a first recess defined therein;

a first cover that is removably attached to the support such that the first gripper jaw is at least partially disposed between the support and the first cover, the first cover having a second recess defined therein; and a stop member removably affixable to the support and the first cover by being received in the first recess of the support and the second recess of the first cover, wherein the stop member is engageable with the first gripper jaw to restrain opening of the first gripper jaw and the second gripper jaw and the size of the stop member corresponds to a discrete maximum degree of opening of the first gripper jaw and the second gripper jaw.

17. The gripper assembly stated in claim 16, wherein the stop member includes a first mounting section that is received in the first recess, a second mounting section that is received in the second recess, and a resilient pad that is disposed between the first mounting section and the second mounting section.

\* \* \* \* \*